United States Patent
Tachick et al.

[15] 3,662,297
[45] May 9, 1972

[54] SUPPORT MEANS FOR PIVOTALLY MOUNTING A POWER CABLE TERMINATION HOUSING

[72] Inventors: Henry N. Tachick, Pittsfield; James E. Belcher, Dalton, both of Mass.

[73] Assignee: General Electric Company

[22] Filed: Mar. 23, 1970

[21] Appl. No.: 21,712

[52] U.S. Cl. .......................................... 339/60 R, 339/119 R
[51] Int. Cl. ...................................... H01r 15/10, H01r 13/60
[58] Field of Search ............. 339/119, 120, 125, 245, 198 E, 339/198 K, 101, 135, 218, 213, 46; 174/161 R, 73 R, 18, 11 BH, 37

[56] References Cited

UNITED STATES PATENTS

| | | | |
|---|---|---|---|
| 3,390,331 | 6/1968 | Brown et al. | 324/122 |
| 2,166,621 | 7/1939 | Budnick | 339/14 |
| 1,679,706 | 8/1928 | Brown | 339/120 X |
| 1,976,769 | 10/1934 | Borden | 339/245 |
| 2,290,717 | 7/1942 | Swanson | 339/125 X |
| 3,236,984 | 2/1966 | Lindell | 174/18 X |
| 3,355,627 | 11/1967 | Clement | 339/119 X |

FOREIGN PATENTS OR APPLICATIONS 1,206,980  10/1962  Germany ............................... 339/119

Primary Examiner—Richard E. Moore
Attorney—Francis X. Doyle, Vale P. Myles, Frank L. Neuhauser, Oscar B. Waddell and Joseph B. Forman

[57] ABSTRACT

Support means are provided for pivotally mounting a cable termination housing in a suitable holding bracket to position the housing in a manner such that a resilient portion of the termination housing that forms a water-tight seal around an electric cable connected thereto is protected from undue mechanical loading so that the water-tight seal is not destroyed by such loading.

9 Claims, 5 Drawing Figures

Inventors,
Henry N. Tachick,
James E. Belcher,
by Vale P. Myles
Their Attorney.

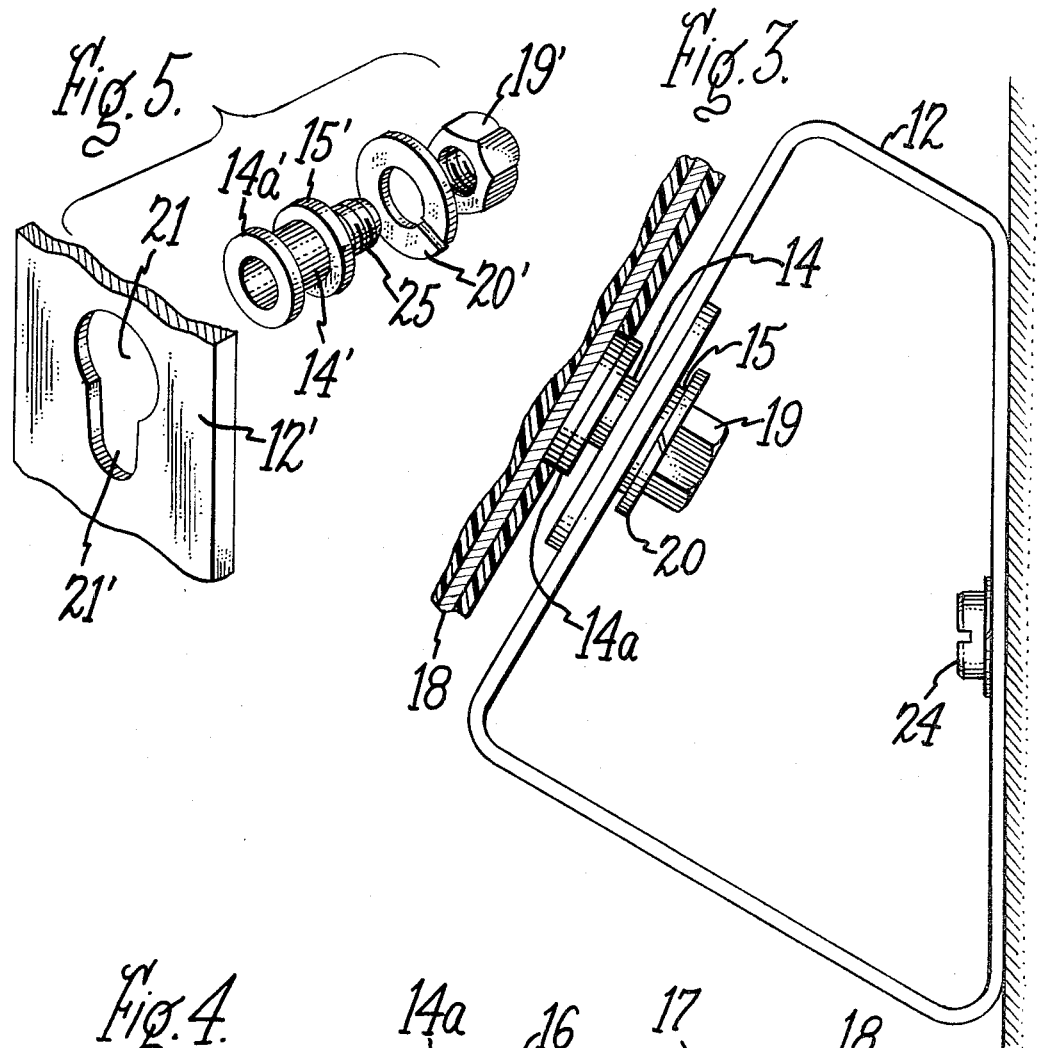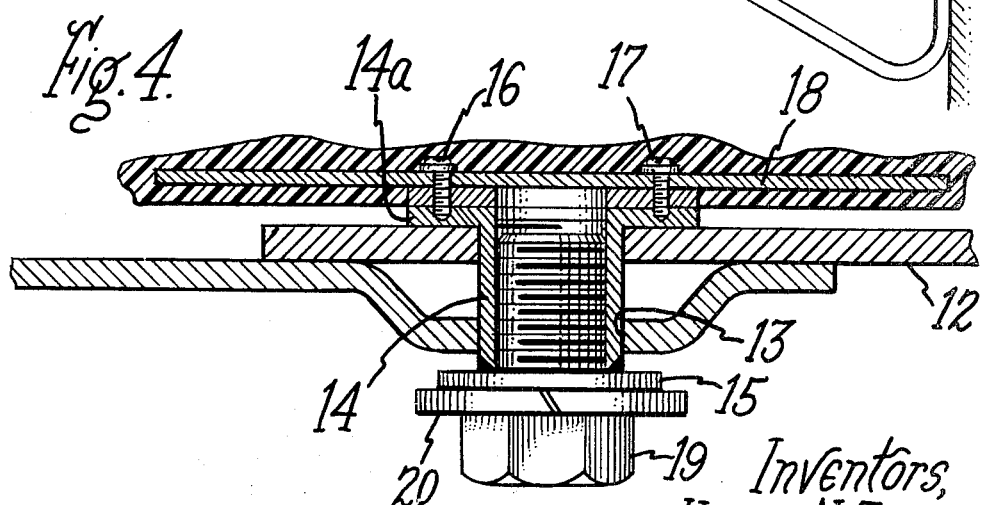

SUPPORT MEANS FOR PIVOTALLY MOUNTING A POWER CABLE TERMINATION HOUSING

In underground electric power distribution systems, it has become common practice to provide modular cable termination housings that are adapted to be readily assembled on the ends of power cables to afford water-tight, voltage grading connectors for coupling two or more cables together or for coupling components such as a distribution transformer, into a system. Such modular cable termination housings frequently have a resilient dilatable aperture that, in its unstressed condition, is smaller than the diameter of a cable on which the housing is designed to be mounted. Accordingly, when such a housing is mounted on a cable, the resilient walls of the aperture are stretched around the outer diameter of the cable insulation to thereby form a water-tight seal between the housing and the cable insulation. Although such sealing arrangements are convenient to work with, since they enable a rapid, inexpensive assembly to be made in the field by a lineman who can simply force the cable termination housing onto a cable to which it is to be connected, it has been found that under certain conditions of mechanical loading these seals tend to be at least partially destroyed so that moisture seeps into the termination housing where it may cause a system fault to ground.

Due to the fact that underground cable termination housings are frequently employed in making cable connections in relatively confined areas, such as those available in underground distribution transformer vaults, the possibility of unduly stressing the resilient water-tight seal of the housings becomes quite significant. This possibility is further heightened by the fact that relatively heavy gage, inflexible cables are coming into more common use as the amount of power conveyed by modern underground distribution systems increases. Of course, such heavier, inflexible cables exert a continuing force on any support means that is used to restrain them in operating position, and this force is accentuated when the cables are sharply bent or coiled in the manner that is frequently necessary to form operating cable connections in the cramped space of underground vaults. Because of the need to overcome this potential problem of damaging the moisture seals on cable termination housings due to mechanical distortion of the seal when a cable that is connected to the housing exerts a force on it which stretches the seal beyond its range of resilient tolerance, supporting means have been developed in the prior art for holding cable terminations, and cables connected to them, in predetermined aligned relationship. One example of such prior art supporting arrangements involves the use of a plurality of mounting brackets that are rigidly positioned on the side wall of an underground transformer vault and adapted to engage both a cable termination housing and a section of the cable connected to it, thereby to maintain the cable alignment with the housing so that the weight of the cable or its inherent resilience cannot exert a torsion force on the housing that would destroy the resilient seal between them. Such supporting means are acceptable for the purpose intended but they have the disadvantage of restricting movement of the cable within the normally confined vault space available for maintenance or assembly work on the distribution system. Also, such prior art cable and termination supporting arrangements usually occupy a substantial portion of the available space in such underground vaults because of the length and size of support necessary to effect plural connections that are needed to maintain relative alignment of the cable with the termination housing. Thus, they are objectionable from this standpoint as well.

In view of the above-cited disadvantages of prior art cable termination supporting means, it is a primary object of the present invention to afford a cable termination support means that provides an economical and efficient-to-manufacture termination housing support that overcomes these disadvantages.

Another objective of our invention is to provide a cable termination support means that requires very little space in use and that serves to maintain a cable termination housing in a predetermined position relative to the longitudinal axis of a cable connected to it, so that the cable cannot exert sufficient mechanical loading on the housing to destroy a resilient water-tight seal between the cable and the housing.

A further objective of the present invention is to provide a cable termination support means that is integral with a cable termination housing and that allows the housing to be moved with a pivotal action in a predetermined plane when the support means is locked in operative position, so that a cable coupled to the housing may be moved in a predetermined arc without overloading a resilient water-tight seal between it and the housing with sufficient torsion force to destroy the seal.

In one preferred embodiment of the invention, a cable termination housing support means is formed by molding a hollow shaft member in a rigidly fixed position on the body of the housing such that a major part of the shaft extends beyond the housing surface. The hollow shaft is threaded and a threaded bolt is screwed into it to retain a smooth, flat washer in predetermined spaced relationship between the head of the bolt and the outermost surface of the hollow shaft member. A second support means in the form of a rigid mounting bracket is positioned on the wall of an underground distribution system vault or similar suitable surface, and is provided with an aperture that receives the head of the bolt and locks it in a position such that the termination housing can be pivoted around the shank of the bolt, or the axis of the hollow shaft member, in a plane that is substantially perpendicular to this axis. Accordingly, a cable connected to the termination housing can be moved through an arc in this plane without applying a destructive force to the water-tight resilient seal between the housing and the cable.

Further objects and advantages of the invention will become apparent to those skilled in the art from the following detailed description of it, as well as by referring to the appended claims and the attached drawings, in which:

FIG. 3 is an enlarged side elevation view, partly in cross-section, illustrating the cable termination housing support means depicted in FIGS. 1 and 2 of the drawing.

FIG. 4 is a cross-sectional view along the plane 4—4 of FIG. 2 showing an enlarged view of the support means illustrated in FIGS. 1–3.

FIG. 5 is a perspective view of several component parts of a second embodiment of the support means illustrated in FIGS. 1–4 of the drawings.

Figure 1:
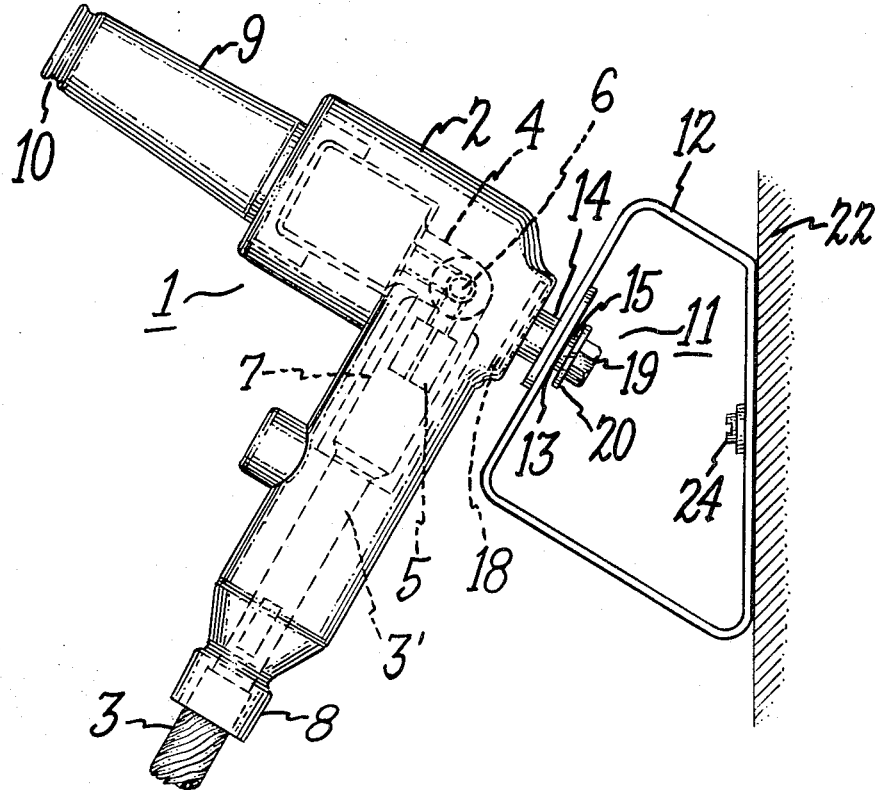
FIG. 1 is a side elevation view, partly in phantom, showing an electric cable termination housing connected to a conventional power cable and positioned by a unique support means pursuant to the present invention to hold the housing in a predetermined plane where it is free to rotate within a given arc of movement.
Figure 2:
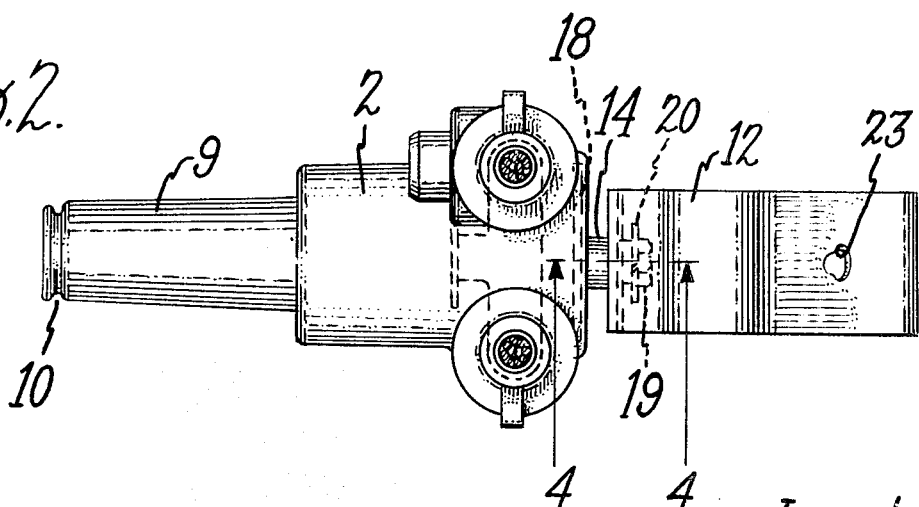
FIG. 2 is a top elevation view of the cable termination housing and support means shown in FIG. 1, with a portion of the depicted support means being illustrated in phantom.

Referring now to FIG. 1 of the drawing, there is shown an underground cable termination 1 having an insulating housing 2 formed of a suitable elastomeric material that affords a water-tight, voltage grading seal around an insulated electric cable 3 when the cable is inserted into the housing. As is now conventional in the field of underground electric power distribution, the outer surface of termination housing 2 is covered with a conductive elastomeric coating (not specifically shown in detail) to contain the electrical stress within the insulation located between the high voltage circuit within the housing 2 and the outer surface thereof. As seen in FIG. 1, a pair of electrical contacts 4 and 5 are mounted adjacent opposed ends of the elongated termination housing 2, but recessed from these respective ends, as shown in FIG. 1. Contacts 4 and 5 are electrically connected together by the junction pin 6 to form an electric power circuit through the housing 2. The cable 3 has its innermost end 3' capped by a suitable metal terminal 7 that is adapted to slide into the contact 5 to form an electrical circuit therewith when housing 2 is forced over the insulation of cable 3.

In order to form a water-tight seal between the housing 2 and cable 3, the recessed portion of housing 2 extending beyond contact 5, and including a flexible sleeve portion 8, has a dilatable aperture that, in its unstretched condition, is slightly smaller in diameter than the diameter of insulation on cable 3. Accordingly, when cable 3 is forced into housing 2, the cylindrical bore or recessed aperture between contact 5 and the outermost end of sleeve portion 8 is resiliently stretched to receive the cable. Thus, a water-tight seal is formed by the resilient compression of this dilatable portion of housing 2 against the cable 3. It should be understood that no claim is made herein to the novel features of sleeve portion 8. Separate application, Ser. No. 27,497, was filed Apr. 30, 1971, directed to this subject matter.

The end of elongated termination 1 opposite the flexible sleeve portion 8 is provided with a tapered sleeve portion 9 having an integral holding ring 10 formed therein at its outermost end. Those skilled in the art will appreciate that the tapered sleeve 9 is adapted to receive another cable termination housing that has a recessed surface shaped to cooperate with the tapered surface 9 to form a water-tight, voltage grading seal between the two cable terminations when a contact on the second termination housing forms electrical contact with the contact 4 of termination 1. It will be appreciated by those skilled in the art that the cable termination 1, as described thus far, comprises generally familiar components and various changes in structure and material may be made to afford the functions sought to be performed by such a termination. Such modifications would not alter the effectiveness of the present invention, as will be apparent from the description of it given below. However, in the event additional information is desired regarding the various materials and structural forms that may be employed to form such a termination, reference can be made to U.S. Pat. No. 3,243,756—Ruete et al, which issued Mar. 29, 1966.

Pursuant to the present invention, the termination 1 is provided with a first support means 11 that is adapted to cooperate with a second support means 12 which, in this embodiment of the invention, comprises a rigid bracket that has an aperture 13 (see FIG. 4) therein for releasably receiving the first support means. In the form of the invention shown in FIGS. 1 through 4 of the drawings, the first support means comprises a shaft member 14 (see FIGS. 3 and 4) that is provided with an integral lip portion 15 adjacent its outermost end. On the inner end of shaft 14 an integral flange 14a is provided, and a pair of threaded screws 16 and 17 are threaded into suitably tapped apertures in flange 14a to secure an enlarged metal disc 18 in fixed, spaced relation with respect to the shaft member 14, as best seen in FIG. 4. The enlarged disc 18 is molded beneath the outer surface of termination housing 2 in the elastomeric material of the housing 2, so that it is held in fixed position thereby. The first support means 11 further comprises a threaded bolt 19 that is adapted to be rotatably secured by the tapped interior walls of shaft member 14 and locked in position against lip portion 15 by a lock washer 20 or other suitable locking means. Thus, it can be seen, by referring specifically to FIGS. 3 and 4, that when bolt 19 is locked in position against washer 20, the washer 20 serves to increase the holding diameter of the lip portion 15 and prevents the shaft member 14 from being removed from the second support means 12.

In the operation of the invention, lip portion 15 of support means 11 is inserted through the enlarged diameter area 21 of aperture 13 in support means 12 (best seen in FIG. 5), and then moved downward so that shaft member 14 rests against the narrow bottom 21' of this aperture 13. Accordingly, the lip portion 15 secures the first support means 11 in relatively locked position with respect to the second support means 12. Then, bolt 19, having lock washer 20 mounted thereon, is threaded into the shaft member 14 to prevent inadvertent removal of the first support means 11 through the enlarged area 21 of aperture 13 of support means 12, since lock nut 20 has a diameter larger than the diameter of area 21. When the component parts are in this assembled position, it will be seen that since support means 11 is mounted on termination 1 adjacent the angle in the elbow, or L-shaped housing 2 thereof, the elongated leg of termination 1 that supports cable 3 is held in a single plane parallel to the legs of the second support means 12 containing aperture 13. Thus, due to the locking arrangement of lip portion 15 and lock washer 20 on support means 11, the termination 1 can be freely rotated in an arc parallel to this plane, as seen in FIG. 1. Such freedom of movement prevents the relatively inflexible cable 3 from exerting a sustained destructive force on the side walls of extended sleeve portion 8 of termination 1, since such a force would simply cause the termination 1 to rotate around the axis of shaft member 14 until the pressure was relieved. Of course, when it is desired to remove the termination 1 from support means 12, a lineman simply unscrews bolt 19 and raises the termination 1 so that lip portion 15 of support means 11 can be passed through the enlarged area 21 of aperture 13 on the bracket 12 to remove it completely from bracket 12.

In the preferred embodiment of our invention depicted in FIGS. 1–4, the embedded disc 18 forms a portion of support means 11 and may be formed of a metal that is subject to some corrosion; accordingly, during the manufacture of the termination 1, care is taken to completely embed the disc 18 in the moldable elastomeric material of housing 2 so that a water-tight seal is formed completely around it, thus protecting it from corrosion. On the other hand, the shaft member 14, bolt 19 and lip portion 15 of support means 11 are formed of relatively corrosion-resistant material, since they will normally be exposed to the relatively corrosive atmosphere present in underground vaults of the type commonly used on electric power distribution systems. It will be understood that support means 12 may be mounted on any suitable surface, such as the steel wall 22 shown in FIG. 1, which may be the casing for a transformer vault on a power distribution system. In the embodiment of the invention depicted in FIGS. 1 and 2, a suitable aperture 23 is provided in bracket 12 so that a threaded bolt 24 can be inserted through it and into wall 22 to secure the bracket 12 in operating position as shown. Of course, the configuration of bracket 12 must be predetermined to afford the desired plane of angular movement for termination 1, when it is supported in operating position by second support means 12.

In a modification of the invention illustrated in FIG. 5 of the drawing, a portion of the first support means 11 is shown in the form of a shaft member 14' that has an integral threaded portion 25 extending outward from it. The threaded portion 25 is adapted to threadably receive a nut 19' and a suitable lock washer 20' for holding the nut 19' in fixed position thereon when in assembled position. In this embodiment of the invention, rather than threading a bolt into a tapped shaft member, such as shaft member 14, as was done in the embodiment of the invention discussed above with reference to FIGS. 1–4, it is simply necessary to lock the support means 11 in operating position by securing a nut 19' to the threaded portion 25 that serves in lieu of the bolt 19 discussed with reference to the foregoing embodiment of the invention.

Further objects and advantages of the invention will be apparent to those skilled in the art and all such modifications and extensions of the invention are intended to be encompassed within the following claims.

What we claim and desire to secure by Letters Patent of the United States is:

1. A high voltage cable termination having an insulating housing that affords a water-tight, voltage-grading seal with a cable connector to which it is adapted to be operatively coupled, comprising:

a. an elongated insulated housing having a pair of contacts mounted therein respectively adjacent opposed ends of the housing but recessed from said ends, said contacts being electrically connected together to form an electrical power circuit through said housing, a recessed portion of said housing extending beyond one of said contacts being provided with means defining a dilatable aperture, said aperture defining means being resiliently expandable to receive a cable having an outer diameter larger than said aperture, thereby to form a resilient water-tight seal between said housing and a cable when the cable is inserted into said aperture, and b. a first support means mounted on said housing intermediate the ends thereof, said first support means being adapted to cooperate with a rigidly positioned second support means to hold said housing in a predetermined position with respect to said second support means such that a relatively inflexible cable can be coupled to said one of said recessed contacts in water-tight relationship without mechanically loading said portion of the housing extending beyond said one contact sufficiently to destroy the water-tight seal formed between it and said cable, said first support means comprising a shaft member having a lip portion thereon adjacent its outer end, said shaft member being mounted on said housing so a predetermined length of the shaft member extends beyond the outer surface of the housing, said lip portion being adapted to cooperate with said second support means to hold said housing in said predetermined position relative to said second support means so that the housing can be rotated in a predetermined plane about said extended shaft member.

2. An invention as defined in claim 1 wherein said first support means also comprises an embedded disc that is rigidly fastened to the extended shaft member, said embedded disc being molded into the housing thereby to be rigidly secured in position relative to said housing.

3. An invention as defined in claim 2 wherein said housing is substantially L-shaped and said embedded disc of the first support means is embedded in the housing at a point thereon closely adjacent the angle in the housing on the outer radius thereof.

4. An invention as defined in claim 2 wherein said embedded disc is formed of a metal plate, and wherein the portion of said housing molded around the disc forms a fluid-tight seal that prevents the disc from being subjected to corrosion by exposure to the atmosphere.

5. An invention as defined in claim 2 in combination with a second support means comprising a rigid bracket having means defining an aperture therein, said aperture being adapted to releasably receive the first support means, said aperture in the second support means also being formed to lock the first support means in said predetermined position when said first support means is mounted in operative relationship therewith.

6. An invention as defined in claim 5 wherein the aperture in the second support means has an enlarged portion for slidably receiving said lip portion therein and a reduced diameter portion in communication with said enlarged portion for slidably receiving said extended shaft member therein, said reduced diameter portion being small enough to prevent said lip portion from passing therethrough, and means for retaining said extended shaft member in the reduced diameter portion of the aperture of said second support means when a cable is connected to the termination, whereby the extended shaft portion is free to rotate in a predetermined plane substantially parallel to the major axis of said lip portion of said first support means but is restrained from moving out of said reduced diameter portion of the aperture.

7. An invention as defined in claim 2 wherein said first support means comprises an embedded disc formed of a relatively corrosive metal, and further comprises an extended shaft member and integral lip portion formed of relatively corrosion-resistant material.

8. An invention as defined in claim 1 wherein said first support means comprises a hollow shaft member and a disc portion fastened to one end of the shaft member, said disc portion being molded into said housing to support the shaft member in a fixed position relative to the housing so that the other end of the shaft member extends beyond the outer surface of the housing.

9. An invention as defined in claim 8 wherein the interior walls of said hollow shaft member are threaded, and wherein said first support means includes a threaded bolt rotatably mounted in said hollow shaft member, in combination with a second support means comprising a rigid bracket having an aperture therein for releasably receiving the shank of said bolt, said aperture being formed to lock the head of said bolt in a relatively fixed position when said first support means is mounted in operative relationship therewith so the housing is retained in said predetermined position by the locking action of said first and second support means.

* * * * *